Figure 1:
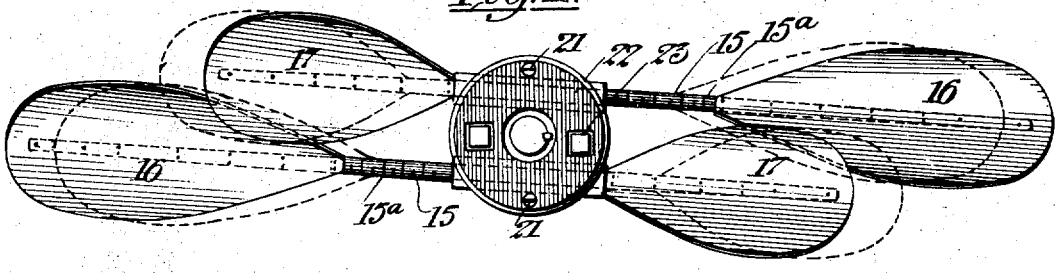

J. A. IRVING.

PROPELLER.

APPLICATION FILED JAN. 9, 1915.

Reissued Feb. 16, 1915. 13,879.

Witnesses:
Titus K. Irvine
Rita Lynch

Inventor:
James A. Irving.
by his Attorney.
Fred V. Becker

UNITED STATES PATENT OFFICE.

JAMES A. IRVING, OF NEW YORK, N. Y.

PROPELLER.

13,879. Specification of Reissued Letters Patent. Reissued Feb. 16, 1915.

Original No. 1,022,846, dated April 9, 1912, Serial No. 606,516. Application for reissue filed January 9, 1915. Serial No. 1,459.

*To all whom it may concern:*

Be it known that I, JAMES A. IRVING, a citizen of the United States, and a resident of the city of New York, borough of Manhattan, in the county and State of New York, have invented a new and Improved Propeller, of which the following is a full, clear, and exact description.

My invention relates to propellers, and more particularly to aeroplane propellers.

Experiments have shown that there is distortion when cutting a thread in a solid substance of great resistibility. When a thread is cut in such an elastic medium as air, which has little normal resistibility, this distortion is greatly increased. This distortion is analogous to the disturbing of the air by a rotating propeller. Investigators of aerial propellers arrive at the conclusion that the less a propeller disturbs the air the greater its efficiency, and that a theoretical propeller of infinitely minute thinness and weight would travel through the air without disturbing it its exact pitch distance when rotated one revolution, if we disregard the frictional surfaces of the blades; but as it is impossible to construct such a propeller or avoid frictional surfaces, the problem must be resolved with a propeller constructed for practical work, which must necessarily have thickness, weight, area and frictional surfaces. Such a propeller will set up disturbances in the air which practically preclude its being considered as a screw, because these disturbances influence or distort the air, and it does not offer the necessary resistibility for cutting a screw thread. In constructing propellers for aeroplanes, great care must be taken to see that the design is such that the propeller will not throw the air laterally. This is so for the efficiency of a propeller is due to its ability to grip the air, condense it, form it into an air cone and give to it volume, weight and velocity, the sum of these being a mechanically created cyclonic force, which, projected against substantially inert air, propels the aeroplane at the necessary speed to exert elevating and sustaining power. Smoke and vapor experiments tend to prove that a propeller draws or absorbs air from the space around it. This air is condensed and takes the form of a truncated cone, with a slightly rotating movement, and is really a modified cyclone as the action and effect are almost identical.

My propeller has been so designed not only to disturb the air as little as possible, and thereby obtain the greatest efficiency, but the blades are adjustable relatively to each other and to the hub, to permit of a ready adjustment of the blades with reference to the weight, the resisting surface, and the frictional surfaces of the aeroplane, and the normal speed of the engine.

Additional objects of the invention will appear in the following complete specification, in which the preferred form of my invention is disclosed.

In the drawings, similar characters of reference indicate corresponding parts in all the views, in which—

Figure 2:
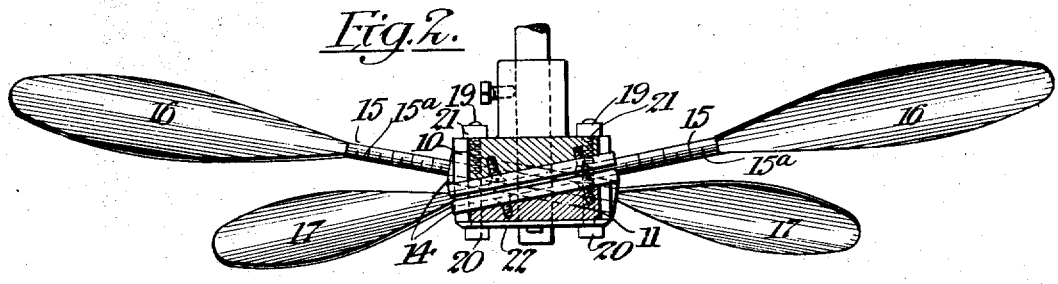
Figure 5:
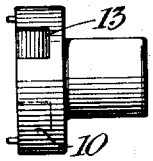
Figure 4:
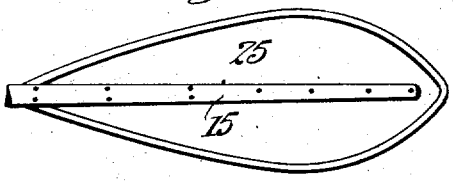
Figure 3:
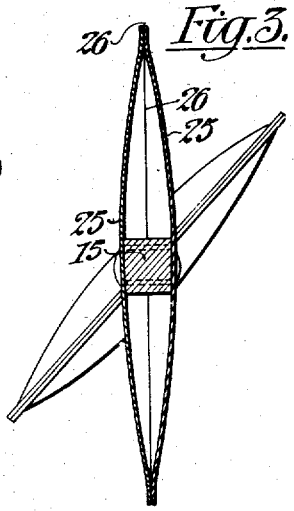
Figure 8:
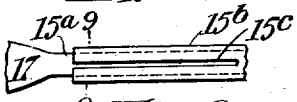
Figure 6:
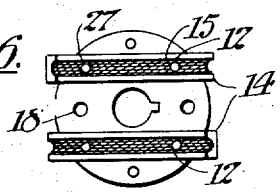
Figure 7:
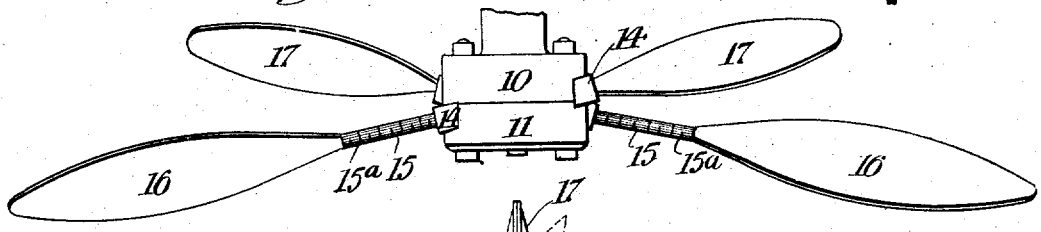

Figure 1 is a rear view of my propeller; Fig. 2 is a plan view of Fig. 1, partially in section; Fig. 3 is a transverse sectional view showing the two propellers mounted on one of the shanks; Fig. 4 is a view of a propeller blade with one of its side members removed showing the other side member and the manner of securing it to the shank; Fig. 5 is a side elevation showing one of the hub members; Fig. 6 is a face view showing a hub member; Fig. 7 is a plan view similar to that shown in Fig. 2, but showing another adjustment of the propeller blades. Fig. 8 is a fragmentary view, showing each shank divided with one of its members disposed in an opening in the other to permit of the rotation of one blade on the shank relating to the other; and Fig. 9 is a sectional view on line 9—9 of Fig. 8.

By referring to the drawings it will be seen that a hub is provided, consisting of members 10 and 11, there being two roughened concave bearing surfaces 12 on the inner face of each of the hub members 10 and 11. As shown in Figs. 5 and 6 of the drawings, I prefer to cut channels 13 in the hub members, and insert in these channels 13 bearing members 14, having the roughened concave bearing surfaces 12 referred to. The bearing members 14 are held in place by means of screws 27, and I prefer to have them project beyond the sides of the hub members. The bearing members 14 on one of the hub members co-act with the bearing members 14 on the other hub member, to grip the shanks 15 on which the propeller blades 16 and 17 are mounted. As will readily be understood by referring to the drawings, the bearing members are so disposed relatively to the axis of the hub, that the shanks 15 will be disposed at an angle to each other, and obliquely relatively to the hub axis. With this construction two of the propeller blades are normally disposed in advance of the hub, the other two propellers blades extending rearwardly of the hub. There are threaded orifices 18 in the hub members, which register with each other, and in these threaded orifices mesh screw members 19, having angular heads 20. Nuts 21 are provided for locking the screw members in place, and a face plate 22 with angular openings 23 is provided, the angular heads 20 being normally disposed in the angular openings 23, the face plate 22 being secured to the hub member 11, by means of screws 24. Two of the propeller blades referred to are mounted on each of the shanks 15, one being disposed at each side of the hub. These propeller blades are constructed by providing side members 25, which are bolted to opposite sides of the shank 15, as shown in Figs. 3 and 4 of the drawings, the peripheries of these side members 25 being secured together at 26, by any preferred means.

As will be seen by referring to Figs. 2 and 7 of the drawings, the propeller blades 16 are considerably larger than the propeller blades 17, and these blades 16 are preferably the leading blades; that is, I prefer to have them extend in a direction in advance of the hub, the shorter propeller blades 17 extending rearwardly of the hub. It will readily be understood that by removing the face plate 22, and unscrewing the screw members 19, the shanks 15 may be rotated as may be desired to secure the desired pitch for the propeller blades, and that the shanks 15 may also be shifted longitudinally to position the propeller blades at predetermined distances from the hub. Each of the shanks 15 is divided by marks $15^a$, which may be referred to in obtaining the desired adjustment. The arrangement of one forwardly extending set of propeller blades in combination with one rearwardly extending set of similar blades, tends to prevent a vacuum forming around the hub of the propeller, and thereby removes undesirable suction.

Figure 9:
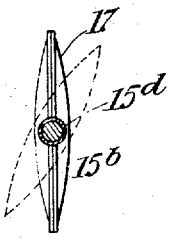

In Figs. 8 and 9 I have shown a divided shank consisting of a tubular member $15^b$ having longitudinal slots $15^c$, the shank member $15^d$ being disposed in the tubular member $15^b$. When the tubular member $15^b$ is gripped by the bearing member 14 it will press against the shank member $15^d$ and hold the tubular member $15^b$ relatively to the shank member $15^d$. With this construction the blades 17 may be disposed at any predetermined angle with relation to the blades 16.

It will be understood that the smaller or inner blades 17 may be set to a much greater pitch than the larger leading blades 17 and that the diameter of the larger blades 16 may be expanded as desired. When the positions of the blades 16 are not changed relatively to the positions of the blades 17, any increase in the pitch of one set of blades will reduce the pitch of the other set of blades. The adjustability of the propeller permits of the balancing and the setting of the blades of the propeller at the desired pitch formed to produce the best results.

Having thus described my invention, I claim as new and desire to secure by Letters Patent:

1. In a propeller a hub, two shanks, four propeller blades one of the propeller blades being mounted on each end of each of the shanks, the propeller blades being spaced from the hub so that one of the blades on each of the shanks will rotate at a distance from the hub greater than that at which the other propeller blade will rotate, and means for holding the shanks in position relatively to the hub.

2. In a propeller a hub, a shank adapted to move laterally relatively to the hub, means for securing the shank relatively to the hub, and two propeller blades mounted on the shank, one at each side of the hub.

3. In a propeller a hub, a shank adapted to move laterally relatively to the hub, means for securing the shank to the hub, and two propeller blades disposed at an angle to each other mounted on the shank, one at each side of the hub.

4. In a propeller a hub, a shank extending obliquely relatively to the axis of the hub, and adapted to move laterally relatively to the hub, means for securing the shank to the hub in any one of a plurality of positions, and two propeller blades secured to the shank, one at each side of the hub.

5. In a propeller a hub, two shanks disposed at an angle to each other, each shank extending obliquely relatively to the axis of the hub, and secured to the hub, and two propeller blades mounted on each of the shanks, one at each side of the hub respectively.

6. In a propeller a hub, composed of two members, with threaded orifices, a shank disposed between the hub members, and normally gripped thereby, a screw member having an angular head normally meshing in the threaded orifices for holding the two head members together, a plate having an angular opening in which the head is normally disposed, secured to one of the hub members, and a propeller blade mounted on the shank.

7. In a propeller a hub, two shanks disposed at an angle to each other and one obliquely relatively to the axis of the hub, each of the shanks being adapted to move laterally relatively to the hub, means for securing the shanks relatively to the hub, and propeller blades secured to the shanks.

8. In a propeller, a hub composed of two members, a divided shank consisting of two telescopic members disposed between the hub members means for pressing the hub members against the shank, and propeller blades mounted on the members of the shank.

9. In a propeller a hub and two propeller blades secured to the hub, both for forward propulsion, one of the blades extending forwardly and the other blade extending rearwardly and having a pitch greater than the forwardly extending blade.

10. In a propeller a hub and two propeller blades, secured to the hub, one of the blades being longer than the other and extending forwardly, the other blade extending rearwardly and having a pitch greater than the forwardly extending blade.

11. In a propeller a hub and two propeller blades secured to the hub, one of the blades being longer than the other and extending forwardly, the other blade extending rearwardly.

12. In a propeller a hub, two propeller blades both for forward propulsion, one of the blades extending forwardly and the other blade extending rearwardly, the blades being adjustable on their axes relatively to the hub, and means for securing the blades to the hub in adjusted positions.

13. A rotatable fluid impelling element comprising: four blades adapted to act in the same direction, arranged in two sets, an inner and an outer set, the blades of the two sets alternating circumferentially, one set of blades having a different plane of rotation from the other set, all blades having a pitch, the pitch of one set of blades being greater than the pitch of the other set of blades.

14. A rotatable fluid impelling element comprising: four blades adapted to act in the same direction, arranged in two sets, an inner and an outer set, the blades of the two sets alternating circumferentially, one set of blades having a different plane of rotation from the other set, all blades having a pitch, the pitch of the inner set of blades being greater than the pitch of the outer set of blades.

15. A rotatable fluid impelling element comprising: a plurality of sets of blades, one set having a different plane of rotation from another, one set being located a different distance from the center of rotation than another, all sets having a pitch, the pitch of one set being different from that of the pitch of another set.

16. A rotatable fluid impelling element comprising: a plurality of sets of blades, one set having a different plane of rotation from another, one set being located a different distance from the center of rotation than the other, all sets having a pitch, the pitch of the set which is nearest the center of rotation being greater than that of the pitch of another set.

17. A rotatable fluid impelling element comprising: a plurality of sets of blades, one set being bent obliquely back of the plane of rotation of another set, one set being located a different distance from the center of rotation of another set, all sets having a pitch, the pitch of one set being different from that of the pitch of another set.

18. A rotatable fluid impelling element comprising: a plurality of sets of blades, one set being bent obliquely back of the plane of rotation of another set and being located a different distance from the center of rotation of another set, all sets having a pitch, the set which is nearest the center of rotation having a greater pitch than that of the pitch of another set.

In testimony whereof I have signed my name to this specification in the presence of two subscribing witnesses.

JAMES A. IRVING.

Witnesses:
MARY W. WALLACE,
AXEL V. BEEKEN.